June 7, 1949.　　　　　　J. GAINO　　　　　　2,472,155
MACHINE FOR CLEANING THE SURFACES
OF VENETIAN BLIND SLATS
Filed Oct. 3, 1946　　　　　　　　　　　　2 Sheets-Sheet 1

INVENTOR.
John Gaino
BY Lawler & Lawler
Attys.

INVENTOR.
John Gaino
BY Lawler & Lawler
Attys.

Patented June 7, 1949

2,472,155

UNITED STATES PATENT OFFICE 2,472,155

MACHINE FOR CLEANING THE SURFACES OF VENETIAN BLIND SLATS

John Gaino, Cleveland, Ohio

Application October 3, 1946, Serial No. 700,974

1 Claim. (Cl. 15—77)

The invention relates broadly to a machine for cleaning the surfaces of a Venetian blind slat.

The object of the invention is to effect such cleaning in an economical and efficacious manner.

Another object is to provide a machine of compact formation, simple and durable in construction, readily assembled, efficient in operation, and comparatively cheap to manufacture.

For the purpose of aiding in the explanation of the invention, I show in the accompanying drawings, hereinafter described, one practical embodiment of the machine. It is to be understood, however, that this embodiment is presented merely by way of illustration, and that the specific showing and description of it is not to be considered in any fashion as limiting the appended claims short of the true and comprehensive scope of the invention in the art. There are, of course, numerous methods of operating the mechanical features of my invention of which I have shown but one.

In said drawings.

Similar numbers of reference refer to similar parts throughout the several views.

Figure 1:
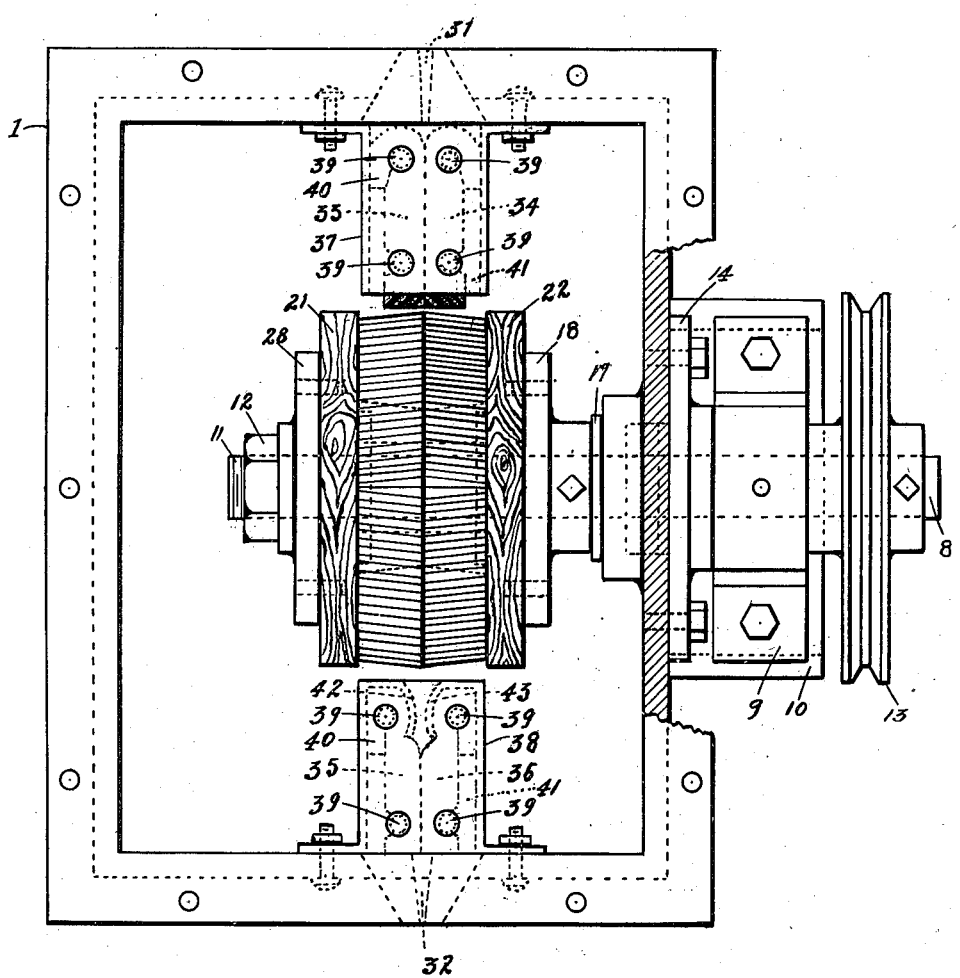
Figure 1 is a top plan view of the liquid receptacle, the cover being removed therefrom to expose the various instrumentalities in the interior thereof, and also showing, on the outside of the receptacle, the bearing bracket, the bearing for the shaft on which the brushes are removably mounted, the stuffing box cover and a pulley on the shaft.

Referring in detail to the drawings, the machine comprises a liquid receptacle 1, a cover 2 removably secured thereon by means of threaded bolts 3, however, any other suitable practical method may be employed. In the cover there is provided a through hole 4 closed by a screw plug 5. When the plug is removed the receptacle may be filled with a suitable cleaning liquid such as any one of the well known alkalies, acids, salts, or other detergents having the proper cleansing properties.

When filling the receptacle the upper cock 6 is open, it being understood that the lower cock 7 is closed; the liquid is then poured through the hole 4 in the cover until it starts to drain from the upper cock, at which time the cock is closed, the proper level for the liquid in the receptacle having been reached.

When the liquid is at the proper level in the receptacle the shaft on which the brushes are mounted is tangent to the top of the liquid therein so that the brushes are submerged slightly less than one-half of their diameter.

The shaft 8 extends from the exterior of the receptacle into the interior thereof, and is journaled in the bearing 9, which may be adjustably supported on the bracket 10. The inner end portion 11 of the shaft is provided with a screw thread for the reception of a nut 12. On the shaft there is provided a pulley 13 fast thereon. The shaft extends through the cover 14 of the stuffing box, thence through the packing 15 in the stuffing box 16, thence through the wall of the box into the interior of the receptacle.

Figure 2:
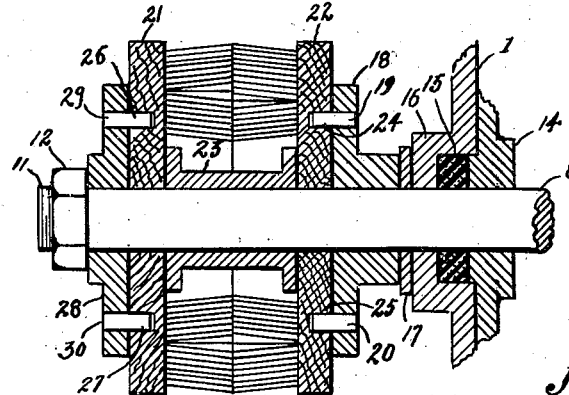
Figure 2 is a fragmentary sectional view parallel to the horizontal axis of the shaft on which the brushes are mounted, and illustrating the stuffing box, and the means employed to maintain the brushes in assembled relationship thereon.
Figure 3:
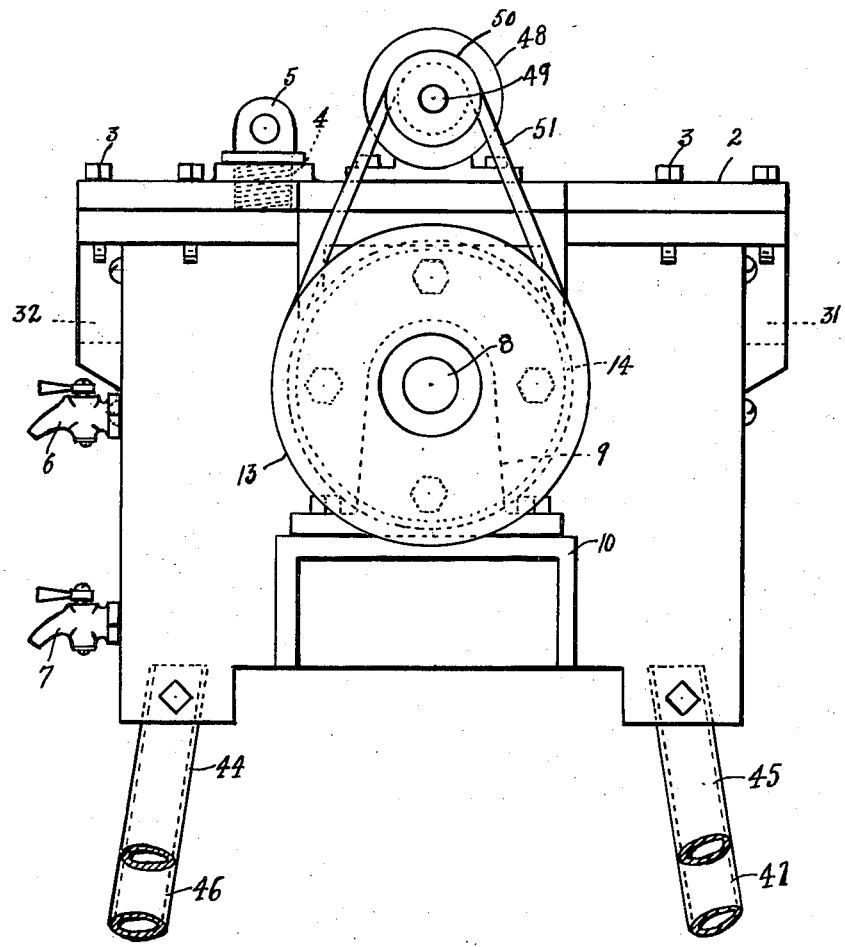
Figure 3 is a side view in elevation of the machine and illustrating the motor mounted on the cover of the liquid receptacle, the pulley on the motor shaft, and the pulley on the shaft on which the brushes are mounted and a belt to drive the same.

On the shaft in the interior of the receptacle there is mounted a friction washer 17, a fixed flange 18 provided with a plurality of fixed projecting studs therein as at 19 and 20 (see Figure 2). Next, two brushes 21 and 22 are mounted thereon, the scrubbing faces of which just slightly touch each other, and are held in this spaced relationship by means of a separator 23 mounted on the shaft, shown clearly in Figure 2. In the back of each brush there is provided bores as at 24, 25, 26 and 27 to receive the projecting studs in the fixed flange 18 and the removably mounted outer flange 28, which is also provided with a plurality of projecting studs as at 29 and 30. When the nut 12 is tightened in the shaft the brushes are prevented from rotating thereon because the brush 22 is fixed relative to the flange 18 through the instrumentality of the projecting studs engaging in the bores in the back of the brush; the outer flange, being likewise provided with projecting studs engage in the bores in the back of the brush 21, and when the brush 21 is forced against the separator it is clamped between the separator and the outer flange, the separator being forced endwise into clamping engagement with the inner face of the back of the brush 22 thus preventing the brush 21 from turning on the shaft.

In the receptacle there is provided two vertically positioned through slots 31 and 32. These slots are longer in length than the width of the Venetian blind slat that passes therethrough, the reason being that the sponge rubber members 33, 34, 35 and 36, removably mounted in the removably mounted retainers 37 and 38, inclose a portion of the slat being forced therethrough, thus preventing the cleaning liquid being forced through the slots when the machine is in operation.

The sponge rubber members are held in assembled relationship in the retainers by means of fixed pins 39 that pass through the upper and lower wall 40 and 41 thereof, and are riveted or otherwise fixed therein. The retainer 38 may be provided with a metal throat as at 42 and 43 (see Figure 1), so that the slat will easily enter between the contacting faces of the sponge rubber members therein. The sponge rubber members mounted in the retainer 38 also act as a wiper for the slat when it is forced between them. Thus when the slat is passed between the brushes and emerges through the slot 32 it is not only scrubbed but also wiped nearly dry.

The lower cock 7 is provided to drain the cleaning liquid from the receptacle when it has become laden with grime.

The receptacle is provided with four removably mounted legs 44, 45, 46 and 47.

On the cover of the receptacle there is mounted a motor 48 having a pulley 50 removably fixed to the motor shaft 49 for a belt 51 to provide a belt drive connection with the pulley 13 on the brush shaft 8.

It is believed that the operation of the machine will be clear, in view of the foregoing description which has been given in connection with that of the construction.

Although the foregoing description is necessarily of a detailed character in order to completely set forth the invention, it is to be understood that the specific terminology is not intended to be restrictive or confining and it is to be further understood that various rearrangements of parts and modification of structural detail may be resorted to without departing from the scope or spirit of the invention herein claimed.

What is claimed is:

A device of the class described, comprising, in combination, a liquid receptacle having a slat inlet and outlet opening oppositely positioned in the wall thereof, a bracket connected to and laterally projecting from the wall thereof, the receptacle having formed in the wall above the bracket a packing recess, the inner wall of which extends into the receptacle and forms a boss therein, a packing in the recess, a removably mounted cover plate for the recess, a bearing block removably mounted on the bracket, a shaft journalled in the bearing block, its inner end portion being threaded, the shaft extending through the cover plate, the packing in the recess, then through the boss into the interior of the receptacle, but stopping short of the inner wall opposite its entry therethrough, a friction washer mounted on the shaft, a removably mounted flange mounted on the shaft, pins in and projecting from a face thereof, a circular brush having bores in the back surface thereof for the reception of the pins, a flanged spacer on said shaft, a companion brush, the flanged spacer interposed between the two brushes, the companion brush being provided with bores in its back surface, a second removably mounted flange on said shaft, additional pins in and projecting from the face thereof to engage in the bores in the back surface of the companion brush, a nut threaded on the threaded end of the shaft and adapted for effecting frictional coupling between the brushes and the spacer, removably mounted retainers in the interior of the receptacle and positioned laterally of the brushes and extending in to proximity of the periphery of the brushes, removably mounted sponge members mounted in the retainers, their contacting faces being in alignment with the inlet and outlet openings and also with the meeting faces of the brushes, a removably mounted cover for the receptacle having a filling opening therethrough, a plug to close the opening, and means to rotate said shaft.

JOHN GAINO.

REFERENCES CITED

The following references are of record in the file of this patent:

UNITED STATES PATENTS

| Number | Name | Date |
| --- | --- | --- |
| 936,699 | Brewer | Oct. 12, 1909 |
| 1,160,613 | Illing | Nov. 16, 1915 |
| 2,273,514 | Chamberlin | Feb. 17, 1942 |
| 2,384,660 | Ward | Sept. 11, 1945 |